(12) United States Patent
Lambert

(10) Patent No.: US 6,313,763 B1
(45) Date of Patent: Nov. 6, 2001

(54) VARIABLE LENGTH DATA PACKET WITH ADJUSTABLE LENGTH INDICATOR

(75) Inventor: Howard Shelton Lambert, Southampton (GB)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/561,428

(22) Filed: Apr. 28, 2000

(30) Foreign Application Priority Data

Apr. 29, 1999 (GB) .................................................. 9909726

(51) Int. Cl.⁷ ...................................................... H03M 7/00
(52) U.S. Cl. .............................................. 341/50; 370/471
(58) Field of Search ..................... 370/465–476; 341/50, 67

(56) References Cited

U.S. PATENT DOCUMENTS

| 4,926,420 | * | 5/1990 | Shimizu | 370/471 |
| 5,768,271 | * | 6/1998 | Seid et al. | 370/389 |
| 5,790,554 | * | 8/1998 | Pitcher et al. | 370/471 |
| 5,790,677 | * | 8/1998 | Fox et al. | 380/24 |
| 6,112,210 | * | 8/2000 | Nori et al. | 707/103 |

* cited by examiner

*Primary Examiner*—Howard L. Williams
(74) *Attorney, Agent, or Firm*—Louis P. Herzberg; Anne Vachon Dougherty

(57) ABSTRACT

The invention relates to a method of encoding and decoding a data stream in which data type information combines with data packet length and identifier information to reduce the required length of the data stream while providing the added functionality of allowing for type checking at the receiving computer.

10 Claims, 2 Drawing Sheets

US 6,313,763 B1

VARIABLE LENGTH DATA PACKET WITH ADJUSTABLE LENGTH INDICATOR

FIELD OF THE INVENTION

The present invention relates to a method, especially operable on pervasive devices eg. communications enabled Personal Digital Assistant, mobile phone, remote field sensors/monitor or other mobile devices, for encoding data for minimal length byte streams for transmission over slow/costly networks.

BACKGROUND OF THE INVENTION

In traditional client/server computing environments, data items along with their identifiers are transmitted within data streams between computers in respective data packets in one of two ways:

- data items are given a fixed length within a data packet according to the maximum required length of a data item. A receiving computer can search for specific data items by searching for their identifiers in the data stream by jumping the known length of a data packet to the identifier in the next data packet; or
- data items are allocated a length sufficient to store the data, and this length variable is stored in another location with a data packet. The receiving computer needs to read the length variable to determine how far to jump to the next identifier location in the data stream.

Clearly, the first method while computationally more simple will require excess bandwidth to transfer redundant information. The second method while computationally more complex requires less bandwidth. Even with the second method, the length variable must be allocated a length sufficiently long enough to define the length of the longest data item. This is turn can be wasteful if data types can vary between long strings or simple integers. Neither method takes into account that identifier lengths can also vary and using a fixed field length for the identifier again requires excess bandwidth.

The present invention defines a simple compact "free format" layout for data items sent over a network, keeping the number of bytes used to a minimum, independent of compression techniques.

DISCLOSURE OF THE INVENTION

Accordingly, the present invention provides a method as claimed in claim 1.

It will be seen that the method according to the invention produces a data stream in which data type information combines with data packet length and identifier information to reduce the required length of the data stream while providing the added functionality of allowing for type checking at the receiving computer.

BRIEF DESCRIPTION OF THE DRAWINGS

An embodiment of the invention will now be described with reference to the accompanying drawings, in which.

Figure 1:
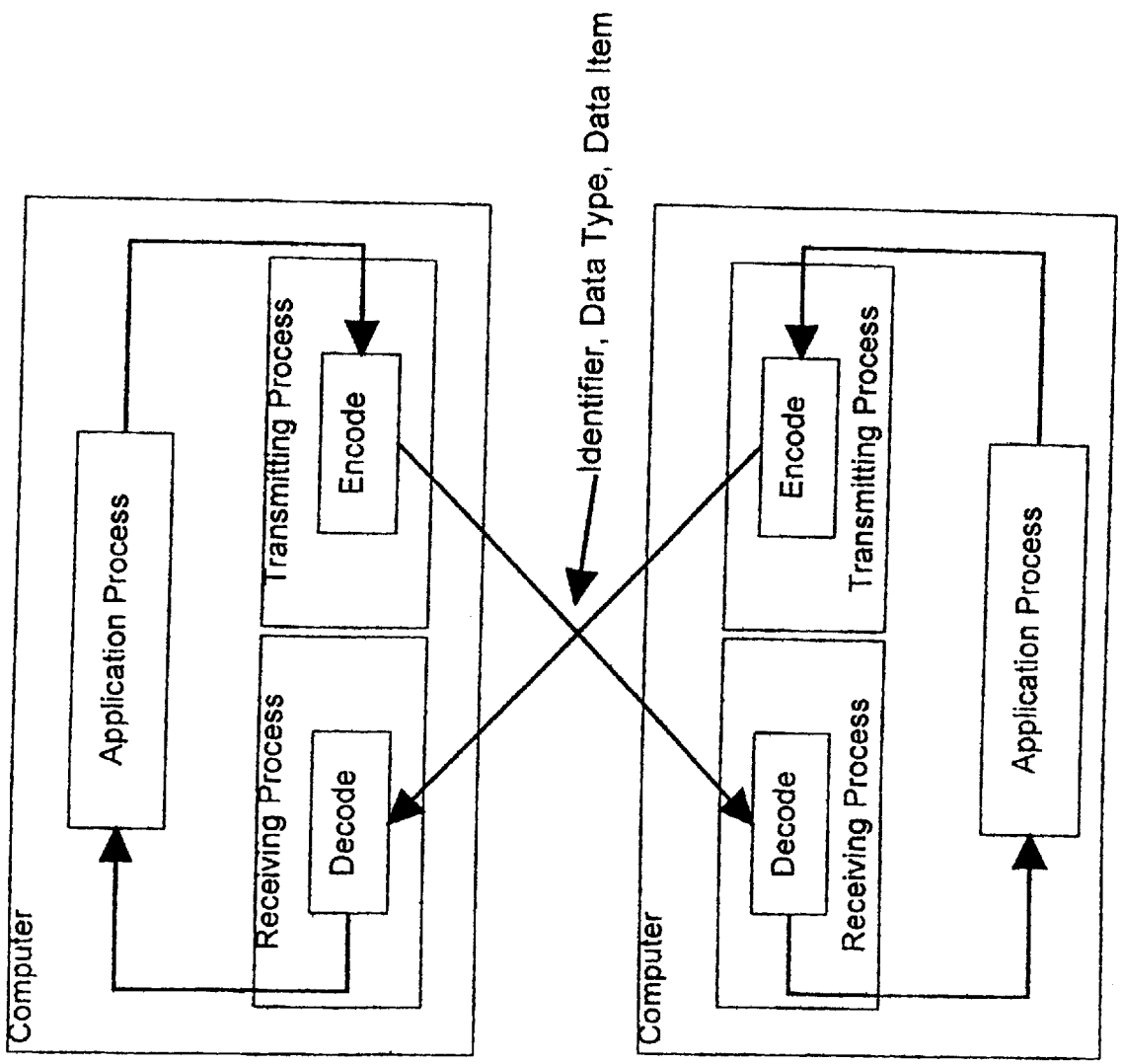
FIG. 1 is a block diagram of a pair of computers communicating across a communication link according to the method of the invention.

In the present embodiment, a transmitting computer is required to transmit a series of data items, each item being of a given type and having an associated identifier, across a communications link to a receiving computer, FIG. 1. Examples, for the purposes of the present description, might be an string data type with an identifier "Account Name" or a real number with an identifier "Balance". The encoding and decoding of the data stream according to the invention can be performed by an application process itself, by a thread within the process or by a separate process as shown in FIG. 1, and the communications link can be any link across any type of network capable of connecting transmitting and receiving processes.

DESCRIPTION OF THE PREFERRED EMBODIMENTS.

Figure 2:
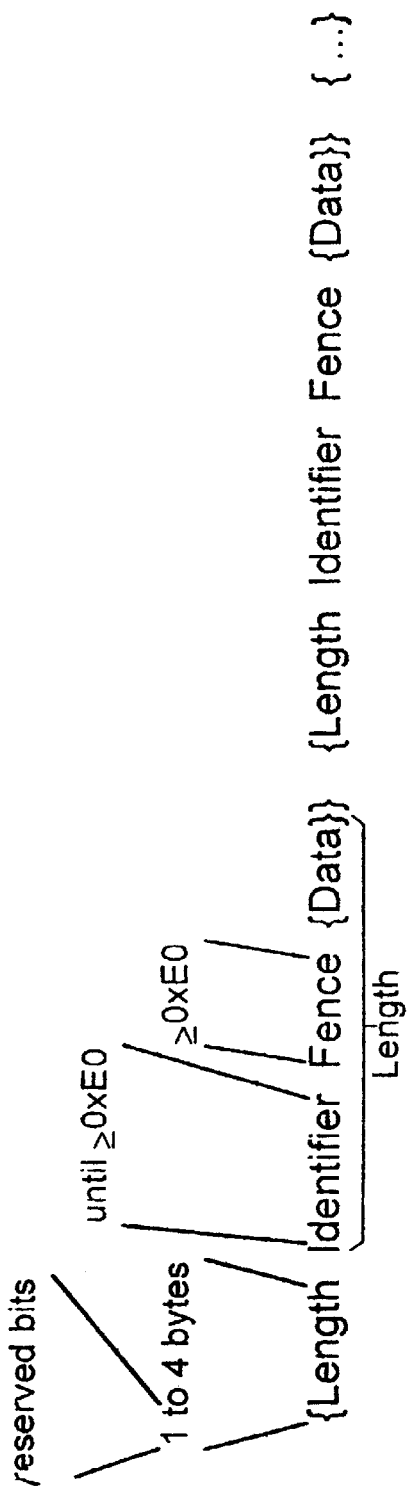
FIG. 2 is a block diagram of the components of a data packet encoded according to the method of the invention.

In the preferred embodiment, a Data item along with its identifier is encoded and transmitted in a data packet within a data stream. The data packet is encoded according to the layout of FIG. 2. Where:

Length defines a variable number of bytes within the data packet following the length field. The length field varies typically between 1 and 4 bytes in length. The length field is encoded in the following manner:

The first byte has its first (most significant) two bits reserved and they are used as the length of the length field i.e.

00=1 byte used for length (6 bits=0–63)
01=2 bytes used for length (14 bits=64–16,383)
10=3 bytes used for length (22 bits=16,384–4,194,303)
11=4 bytes used for length (30 bits=4,194,304–1,073,741,823)

The remainder of the first byte in combination with the contents of up to the next three bytes give the remaining length of the data packet—i.e. the combined length of the identifier, fence and data item.

It should be noted that 3 or more reserved bits could be used, but this is generally unnecessary as even an (8 byte–3 bit) Length field would represent an extremely long Data item, i.e. 61 bits for a length.

Identifier is a variable length string of bytes (in the preferred embodiment, each byte value must be less than 0xE0). Typically an Identifier would be an ASCII string for which a restriction to byte values less than 0xE0 would not cause a problem. The end of the identifier field is detected by a receiving computer when a byte with a value greater than or equal to 0xE0 is encountered as this is the beginning of the Fence field.

Fence is a special byte delimiting the boundary between the identifier and the optional Data item. This byte is used to contain the data type of the Data item. An example of a partial coding scheme for Fence is shown in Table 1. The remaining codes above E9 and F9 could be used for types such as reals.

Thus, it can be seen that the single Fence byte performs 3 distinct functions:

Delimiting the Identifier
Defining the data type; and
In some cases, defining that the data is:
 null rather than no data in a Data item;
 a positive or negative integer, with no Data bytes sent, for integer values 0 cr —1; and
 boolean true or false with no Data bytes sent.

Figure 3:
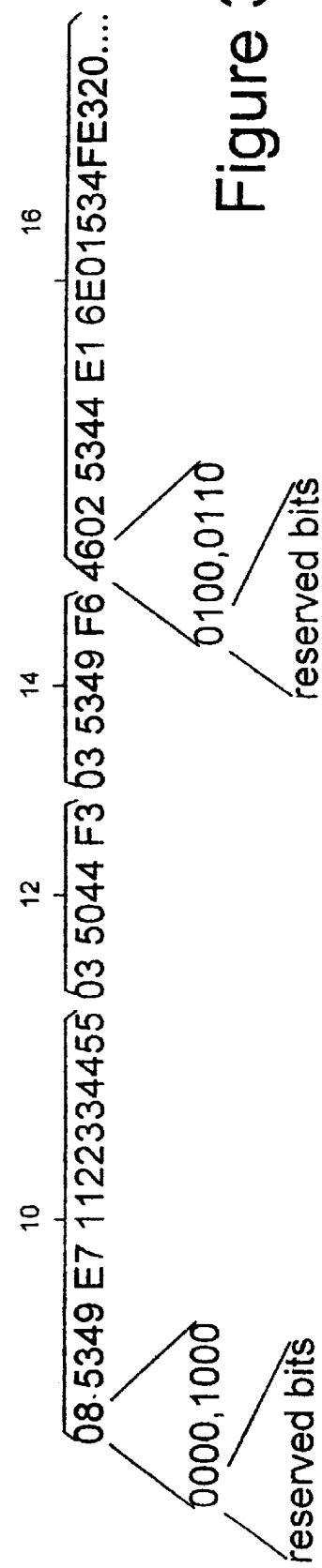
FIG. 3 illustrates a portion of a data stream generated according to the method of the invention.

An example byte stream encoded according to the method of the invention is shown in FIG. 3. In the first field 10, the first two bits of the first byte are b00 indicating a length field one byte long. The remaining bits add up to 8 indicating that 8 bytes are to follow the length field. The next two bytes 0x53 and 0x49 correspond to an identifier field having an ASCII value of "SI". This is followed by a fence field indicating an 8 byte integer data type with leading 00's suppressed is to follow. In this data packet, it can be seen that the first three bytes of the integer Data item are suppressed.

The second and third data packets 12 and 14 respectively include a 1 byte length field indicating a remaining field length of 3 bytes. Because the identifier field in both cases is two bytes long, a receiver would expect that the data item will not contain any data. In the packets 12 and 14 respectively this is confirmed because the fence bytes indicates a byte type with null value and a 4 byte integer type of value −1 follows. So it can be seen that in both cases the fence field enables typed data to be transmitted in one byte.

The ability to specify null data items rather than data items with no content provides an important distinction particularly when a string is transmitted. Because if the fence byte were 0xE1 rather than 0xF1, it would indicate a string with no contents rather than a null string. As seen above, it also allows integer bytes of value −1 to be transmitted only by indicating their data type.

In the fourth packet 16 a two byte field length is required as indicated by the first two bits of the byte 0x46. The following 0x02 byte then forms the most significant portion of the length value with the reserved bits being removed from the least significant portion to indicate b0000 0010 00 0110 bytes follow. The fence byte indicates a string data type follows. A receiving computer knows that the length of the Data item is the length value for the packet less the two bytes of the identifier field plus the fence byte.

Using this data structure, savings in the byte stream are achieved by:

using a variable length field (1 to 4 bytes) where only the required length bytes are sent;

using a variable length Identifier field where only the required bytes are sent; and suppressing leading 0x00s and 0xFF's of integer values in the output stream again sending only the required bytes;

with these three variable lengths being indicated within only one length field.

It should also be seen that because all the Data items are typed, not only can they be type checked at the receiving end, Null Data items can be transmitted simply by indicating their data type. this enables the presence of the even null data items to be checked at the receiving end. Furthermore in the preferred embodiment, actual boolean values are transmitted simply by indicating their data type as either 0xE4 or 0xF4.

It will be seen that the order of the data packets within the data stream is not significant as the stream can be searched to find a matching Identifier. Such a search is fast as the Length field can be used to skip to the next packet to try to match the Identifier.

Further savings can be achieved by compressing the data. Compressors can usually be helped by performing an XOR of one packet with a previous packet in the byte stream producing repeated bytes of 0x00. Because of the variable length of the packets produced according to the invention, however, and because the order of the packets may change, a simple XOR would not produce many zeros in the byte stream. An intelligent XOR, however, that worked on a packet by packet basis could produce repeated 0x00 bytes thus assisting the compressor.

TABLE #1

| Code | Comments |
| --- | --- |
| 0xE0 | Data is un-typed |
| 0xF0 | null (no Data item) - un-typed |
| 0xE1 | Data is ASCII |
| 0xF1 | null (no Data item) - ASCII type |
| 0xE2 | Data is Unicode |
| 0xF2 | null (no Data item) - Unicode type |
| 0xE3 | byte(s) |
| 0xF3 | null (no Data item) - byte type |
| 0xE4 | boolean (false) - (no Data item) |
| 0xF4 | boolean (true) - (no Data item) |
| 0xE5 | short (2 byte integer) 0x00 byte(s) suppressed |
| 0xF5 | negative value short (2 byte integer) 0xFF byte(s) |
| 0xE6 | int (4 byte integer) 0x00 byte(s) suppressed |
| 0xF6 | negative value int (4 byte integer) 0xFF byte(s) |
| 0xE7 | long (8 byte integer) 0x00 byte(s) suppressed |
| 0xF7 | negative value long (8 byte integer) 0xFF byte(s) |
| 0xE8 | Data is an object |
| 0xF8 | null (no Data item) - object type |

What is claimed is:

1. A method of encoding a data stream comprising a plurality of packets, each packet comprising a data item of a given data type and an associated identifier, for each packet, the method comprising the steps of:

calculating the length of said identifier;

calculating the length of the data item;

calculating the length of a length field required to store the combined length of the identifier, the data item and a data type field and an index indicating the length of the length field; and constructing the packet comprising said length field including said index, said identifier, said data type field and said data item, said data type field including data signalling the end of the identifier.

2. A method according to claim 1 including the step of identifying a negative value integer data type, wherein said constructing step includes setting the data type field to indicate a negative value integer and wherein said constructing step suppresses leading 0xFF's in said data item.

3. A method according to claim 1 including the step of identifying a positive value integer data type, wherein said constructing step includes setting the data type field to indicate a positive value integer and wherein said constructing step suppresses leading 0x00's in said data item.

4. A method according to claim 1 including the step of identifying a boolean data type, wherein said construction step includes setting the data type field to indicate either a true or false boolean value and wherein said constructing step constructs a data item with no length.

5. A method according to claim 1 including the step of identifying a null data item of a given data type, wherein said constructing step includes setting the data type field to indicate a null data item of said data type and wherein said constructing step constructs a data item with no length.

6. A computer program product comprising computer program code stored on a computer readable storage medium for, when executed on a computing device, encoding a data stream, the program code comprising means for performing the method as claimed in claim 1.

7. A computer system including means for encoding a data stream comprising a plurality of packets, each packet comprising a data item of a given data type and an associated identifier, the computer system including means operable on each packet, comprising:

means for calculating the length of said identifier;

means for calculating the length of the data item;

means calculating the length of a length field required to store the combined length of the identifier, the data item and a data type field and an index indicating the length of the length field; and means for constructing the packet comprising said length field including said index, said identifier, said data type field and said data item, said data type field including data signalling the end of the identifier.

8. A method of decoding a data stream comprising a plurality of packets, each packet comprising a length field including an index indicating the length of the length field, an identifier field, a data type field including data signaling the end of the identifier field and a data item, for each packet, the method comprising the steps of:

determining from said index the length of the length field;

determining from the remainder of the length field, the length of the packet;

determining the identifier according to when said data type field is encountered;

determining from said data type field the data type of said data item;

determining the length of the data item according to the length of the identifier and said data type field; and determining a data value according to said data type and any data stored in said data item.

9. A computer program product comprising computer program code stored on a computer readable storage medium for, when executed on a computing device, decoding a data stream, the program code comprising means for performing the method as claimed in claim 8.

10. A computer system including means for decoding a data stream comprising a plurality of packets, each packet comprising a length field including an index indicating the length of the length field, an identifier field, a data type field including data signalling the end of the identifier field and a data item, the computer system including means operable on each packet, comprising:

means for determining from said index the length of the length field;

means for determining from the remainder of the length field, the length of the packet;

means for determining the identifier according to when said data type field is encountered;

means for determining from said data type field the data type of said data item;

means for determining the length of the data item according to the length of the identifier and said data type field; and means for determining a data value according to said data type and any data stored in said data item.

* * * * *